United States Patent
Park et al.

(10) Patent No.: US 9,159,131 B2
(45) Date of Patent: Oct. 13, 2015

(54) DATA MATCHING METHOD AND DATA MATCHING APPARATUS FOR MATCHING DATA GROUPS ACCORDING TO ALIGNMENT PARAMETERS

(71) Applicant: Samsung Electronics Co., Ltd., Suwon-Si, Gyeonggi-Do (KR)

(72) Inventors: Soon Yong Park, Bucheon-si (KR); Kyung Shik Roh, Seongnam-si (KR)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 0 days.

(21) Appl. No.: 14/162,883

(22) Filed: Jan. 24, 2014

(65) Prior Publication Data
US 2014/0314328 A1   Oct. 23, 2014

(30) Foreign Application Priority Data
Apr. 22, 2013 (KR) .................. 10-2013-0044073

(51) Int. Cl.
| | |
|---|---|
| *G06K 9/32* | (2006.01) |
| *G06T 7/00* | (2006.01) |
| *G06K 9/62* | (2006.01) |
| *G06K 9/68* | (2006.01) |

(52) U.S. Cl.
CPC .............. *G06T 7/003* (2013.01); *G06K 9/6203* (2013.01)

(58) Field of Classification Search
CPC ..... G06K 9/6423; G06K 9/2009; G06K 9/32; G06K 9/6203; G06F 17/30249; G06T 7/0028; G06T 7/001; G06T 7/0026; G06T 7/0034; G06T 7/0024; G06T 7/003
See application file for complete search history.

(56) References Cited

U.S. PATENT DOCUMENTS

| | | | |
|---|---|---|---|
| 5,951,571 A | 9/1999 | Audette | |
| 6,597,818 B2 * | 7/2003 | Kumar et al. | 382/294 |
| 7,783,113 B2 * | 8/2010 | Oh et al. | 382/209 |
| 7,822,291 B2 * | 10/2010 | Guetter et al. | 382/294 |
| 8,323,198 B2 * | 12/2012 | Sui et al. | 600/444 |
| 8,437,577 B2 * | 5/2013 | Ferguson | 382/294 |
| 8,639,023 B2 * | 1/2014 | Kim et al. | 382/154 |
| 8,867,836 B2 * | 10/2014 | Warfield et al. | 382/173 |
| 2012/0114175 A1 | 5/2012 | Hwang et al. | |
| 2013/0250123 A1 * | 9/2013 | Zhang et al. | 348/164 |
| 2014/0314328 A1 * | 10/2014 | Park et al. | 382/218 |

FOREIGN PATENT DOCUMENTS

| | | |
|---|---|---|
| KR | 10-0930626 B1 | 12/2009 |
| KR | 10-2012-0048370 A | 5/2012 |

* cited by examiner

*Primary Examiner* — Amir Alavi
(74) *Attorney, Agent, or Firm* — Harness, Dickey & Pierce, P.L.C.

(57) ABSTRACT

Data matching includes receiving a piece of first relational data and a piece of second relational data. The piece of first relational data is associated with a plurality of pieces of first data, and the piece of second relational data is associated with a plurality of pieces of second data. An approximate value of the piece of second relational data is calculated. A similarity is calculated based on the piece of first relational data and the approximate value of the piece of second relational data. A correspondence between a piece of the first data and a piece of the second data is determined based on the calculated similarity. An alignment parameter is calculated based on the determined correspondence, and a first data group including the piece of the first data is matched with a second data group including the piece of the second data based on the alignment parameter.

20 Claims, 12 Drawing Sheets

FIG. 6

|     | $X_1$    | $X_2$    | $X_3$    | $X_4$    |
|-----|----------|----------|----------|----------|
| $Y_1$ | $Z_{11}$ | $Z_{12}$ | $Z_{13}$ | $Z_{14}$ |
| $Y_2$ | $Z_{21}$ | $Z_{22}$ | $Z_{23}$ | $Z_{24}$ |
| $Y_3$ | $Z_{31}$ | $Z_{32}$ | $Z_{33}$ | $Z_{34}$ |
| $Y_4$ | $Z_{41}$ | $Z_{42}$ | $Z_{43}$ | $Z_{44}$ |

FIG. 7

|     | $X_1$ | $X_2$ | $X_3$ | $X_4$ |
|-----|-----|-----|-----|-----|
| $Y_1$ | 4.5 | 0.2 | 1.5 | 2.0 |
| $Y_2$ | 0.3 | 4.1 | 1.7 | 1.6 |
| $Y_3$ | 1.4 | 1.6 | 4.3 | 0.9 |
| $Y_4$ | 1.9 | 1.4 | 0.8 | 3.9 |

DATA MATCHING METHOD AND DATA MATCHING APPARATUS FOR MATCHING DATA GROUPS ACCORDING TO ALIGNMENT PARAMETERS

CROSS-REFERENCE TO RELATED APPLICATION

This application claims the benefit of Korean Patent Application No. 2013-0044073 on Apr. 22, 2013, in the Korean Intellectual Property Office, the disclosures of which are hereby incorporated by reference in its entirety for all purposes as if fully set forth herein.

BACKGROUND

1. Field

Example embodiments relate to a data matching method and a data matching module.

2. Description of the Related Art

Data matching is a method for detecting data corresponding to each other from among plural pieces of data, which belong to different data groups, and synthesizing or displaying the detected data as a single data group. An example of data matching is image registration. Image registration is a process to establish the correspondence between different images of the same object, which are acquired at different positions or at different times, to connect or match the different images.

Specifically, when a plurality of images is acquired by photographing the same object at different points, the object may be represented in different forms on the images. In other words, the object can be represented in different coordinate systems in the images. Here, matched parts of the images can be detected by comparing intensities, shapes or characteristics of the images. For example, a characteristic part of the object can be detected. Image registration is a method of connecting or matching multiple images using detected corresponding parts. That is, image registration processes multiple images acquired from the same object to represent the objects in the multiple images in a coordinate system.

Image registration can be used to determine temporal trend of a specific object or reconstruct a specific object three-dimensionally and thus image registration is applied to object detection, remote sensing, face recognition, etc.

SUMMARY

Example embodiments provide a data matching method and a data matching module to appropriately match a plurality of pieces of data of a plurality of data groups.

Example embodiments provide a data matching method and a data matching module for reducing a quantity of data used for data matching, such that necessary resources, such as memory capacity, are reduced and/or decreased.

Example embodiments provide a data matching method and a data matching module for performing data matching at an increased rate.

According to an example embodiment, a data matching method is provided. The data matching method includes receiving at least one piece of first relational data and at least one piece of second relational data. The at least one piece of first relational data may be associated with a plurality of pieces of first data, and the at least one piece of second relational data may be associated with a plurality of pieces of second data. The method includes calculating an approximate value of the at least one piece of second relational data. The method includes calculating a similarity based on the at least one piece of first relational data and the approximate value of the at least one piece of second relational data. The method includes determining a correspondence between at least one piece of the first data from among the plurality of pieces of the first data and at least one piece of the second data from among the plurality of pieces of the second data. The correspondence may be based on the calculated similarity. The method includes calculating an alignment parameter based on the determined correspondence. The method includes matching a first data group including the at least one piece of the first data with a second data group including the at least one piece of the second data. The matching may be based on the alignment parameter.

According to another example embodiment, a data matching module is provided. The data matching module includes a data input module configured to receive a plurality of pieces of first data and a plurality of pieces of second data. The data matching module includes a relational data calculator configured to calculate at least one piece of first relational data associated with the plurality of pieces of the first data and at least one piece of second relational data associated with the plurality of pieces of the second data. The data matching module includes an approximate calculator configured to calculate an approximate value of the at least one piece of second relational data. The data matching module includes a data determination unit configured to calculate a similarity based on the at least one piece of first relational data and the approximate value of the at least one piece of second relational data, and determine a correspondence between at least one of the plurality of pieces of the first data and at least one of the plurality of pieces of the second data, the correspondence being based on the calculated similarity. The data matching module includes an alignment parameter calculator configured to calculate an alignment parameter based on the determined correspondence. The data matching module includes a matching unit configured to match a first data group including the at least one piece of the first data and a second data group including the at least one piece of the second data based on the alignment parameter.

BRIEF DESCRIPTION OF THE DRAWINGS

These and/or other aspects of the invention will become apparent and more readily appreciated from the following description of the embodiments, taken in conjunction with the accompanying drawings of which:

FIGS. 5, 6 and 7 illustrate a method of detecting matched data based on similarity according to an example embodiment;

DETAILED DESCRIPTION

Figure 1:
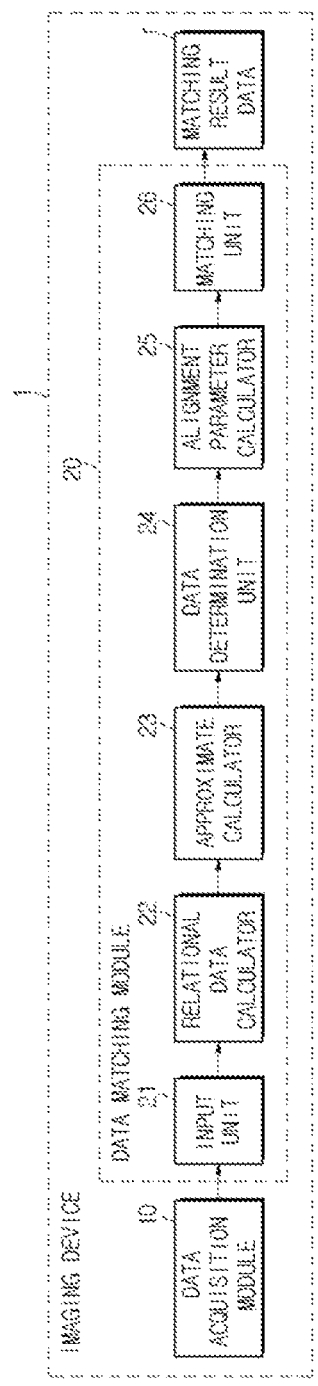
FIG. 1 is a block diagram illustrating a configuration of an imaging device according to an example embodiment.

Detailed example embodiments are disclosed herein. However, specific structural and functional details disclosed herein are merely representative for purposes of describing example embodiments. Example embodiments may, however, be embodied in many alternate forms and should not be construed as limited to only the embodiments set forth herein.

Accordingly, while example embodiments are capable of various modifications and alternative forms, embodiments thereof are described in detail. It should be understood, however, that there is no intent to limit example embodiments to the particular forms disclosed, but to the contrary, example embodiments are to cover all modifications, equivalents, and alternatives falling within the scope of example embodiments. Like numbers refer to like elements throughout the description.

It will be understood that, although the terms first, second, third, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order as described. For example, two operations described in succession may in fact be executed substantially concurrently or may sometimes be executed in the reverse order, depending upon the functionality/acts involved.

Reference will now be made in detail to embodiments. In this regard, the present embodiments may have different forms and should not be construed as being limited to the descriptions set forth herein. Accordingly, the embodiments are merely described below to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Hereinafter, a data matching method and a data matching module will be described below with reference to the annexed drawings.

FIG. 1 is a block diagram illustrating a configuration of an imaging device according to an example embodiment. FIG. 1 is a block diagram illustrating a configuration of an image device 1. Referring to FIG. 1, the imaging device 1 may include a data acquisition module 10 and a data matching module 20 for matching data collected by the data acquisition module 10.

It should be noted that the image device 1 may be a hardware computing device including one or more processors, a computer-readable storage medium, a transceiver, and/or one or more electronic image sensors. The one or more processors are configured implement the components and modules as shown in FIG. 1. The image device 1 may be capable of sequentially and automatically performing a sequence of arithmetic or logical operations; equipped to record/store digital data on a machine readable medium; and transmit and receive digital data via one or more network devices. The image device 1 may include computing devices, such as smart phones, tablet PCs, and/or any other physical or logical device capable of recording and/or capturing, storing, and/or transferring digital data.

The data acquisition module 10 may collect a plurality of data pieces belonging to one of a plurality of data groups.

The data acquisition module 10 may collect the plurality of data pieces at different viewpoints, in different directions, and/or at different distances. The data acquisition module 10 may acquire the plurality of data groups by separately storing collected data according to data collection time or positions. A data group may be an aggregation or collection of a plurality of stored data.

According to various embodiments, the data acquisition module 10 may be a camera module that receives visible light to acquire image data regarding an object. According to various embodiments, the data acquisition module 10 may receive light emitted from an object or reflected by the object through a photosensitive member at different times or positions to acquire image data regarding the object. In this case, the image acquisition module 10 can separately store plural pieces of acquired image data based on acquisition time or positions to acquire plural data groups.

Figure 2:
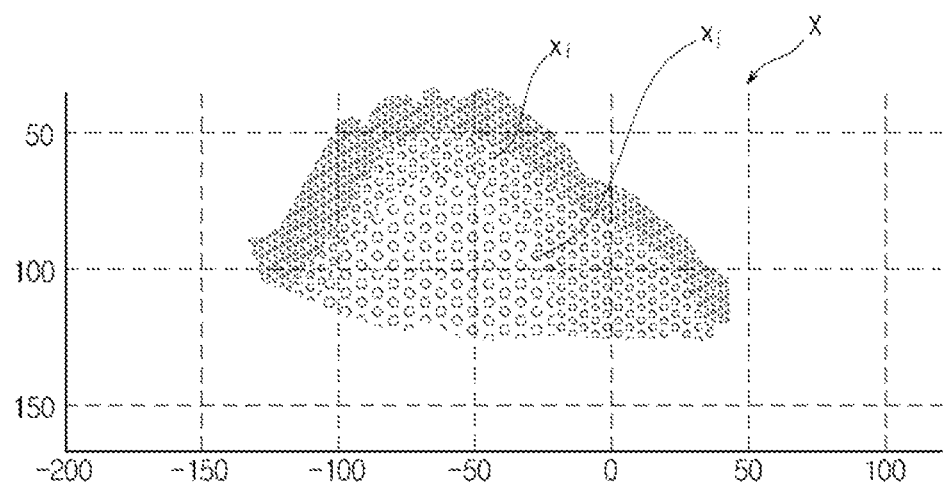
FIGS. 2 and 3 illustrate data groups according to an example embodiment.
Figure 3:
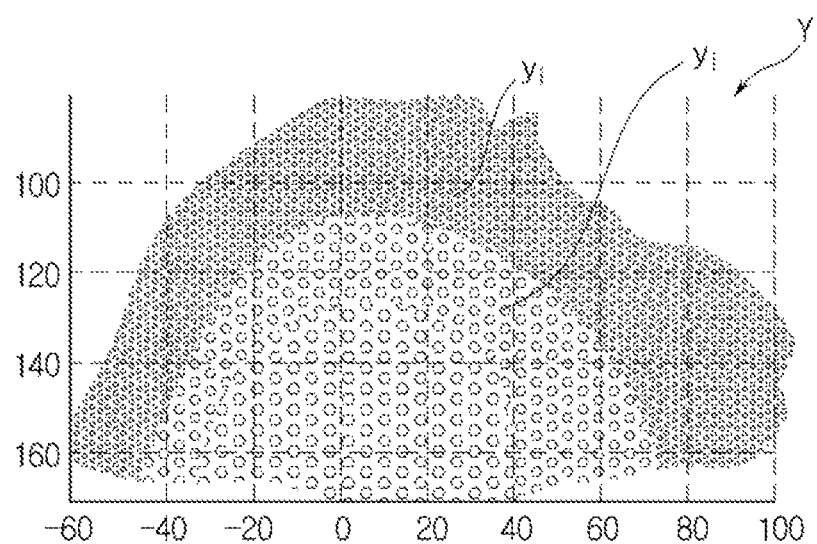

FIGS. 2 and 3 illustrate data groups according to an example embodiment. For example, when the data acquisition module 10 is a camera module, the camera module may photograph an object at a predetermined distance in a predetermined direction and acquire a predetermined first data group X regarding the object, as shown in FIG. 2, using all or some image data regarding the object. The first data group X may be composed of one or more pieces of first image data $x_i$ and $x_j$.

The first data group X may be a set of all image data corresponding to a captured image of the object or a set of some image data of the captured image of the object, for example, feature points. Otherwise, the first data group X may be a set of some image data arbitrarily extracted from the image data.

The image data $x_i$ and $x_j$ included in the first data group X may be raw data acquired by the camera module or amplified image data obtained by amplifying the raw data. Otherwise, the image data $x_i$ and $x_j$ may be analog-to-digital-converted image data. Furthermore, the image data $x_i$ and $x_j$ may be image data on which predetermined image processing has been performed. That is, the image data corresponding to the first data group X may be data of various types, which can be processed using an IC chip or the like.

As shown in FIG. 2, the first image data $x_i$ and $x_j$ of the first data group X include a portion of a shape and/or object representing a cloud.

The camera module corresponding to the image acquisition module 10 may further acquire image data regarding the object at times and/or positions different from the time and/or position at which the first data group X is acquired such as, in a different direction and/or at a different distance. The image acquisition module 10 may acquire a second data group Y with respect to an object, as shown in FIG. 3, using all or some acquired image data regarding the object. The second data group Y may be composed of one or more pieces of second image data $y_i$ and $y_j$. In this case, the photographed object may be the same or similar object as that from which the first image data $x_i$ and $x_j$ is acquired.

As described above, the second data group Y acquired by the data acquisition module 10 may include a set of all image data of a captured image of an object, a set of some image data of the captured image of the object (e.g., feature points), or a set of some image data arbitrarily extracted from the image data.

As shown in FIG. 3, the second image data $y_i$ and $y_j$ of the second data group Y include a portion of a shape and/or object representing a cloud, which is same or similar to the first data group X.

According to various embodiments, the second data group Y may be generated using the similar method as that used to generate the first data group X. According to some embodiments, the second data group Y may be generated using the same method as that used to generate the first data group X. That is, if the first data group X is composed of all the first image data $x_i$ and $x_j$, the second data group Y may be composed of all the second image data $y_i$ and $y_j$.

The first data group X of FIG. 2 and the second data group Y of FIG. 3 may be represented differently from each other due to a difference between data acquisition times and/or positions. That is, some image data of the first data group X may be identical to data of the second data group Y, while some image data of the first data group X is different from some image data of the second data group Y.

According to various embodiments, if the first image data $x_i$ and $x_j$ of the first data group X and the second image data $y_i$ and $y_j$ of the second data group Y are acquired at the same distance and in different directions, the first image data $x_i$ and $x_j$ and the second image data $y_i$ and $y_j$ respectively contain information about the same object viewed in different directions. Accordingly, the first image data $x_i$ and $x_j$ of the first data group X may include image data corresponding to the second image data $y_i$ and $y_j$ of the second data group Y. On the contrary, the second image data $y_i$ and $y_j$ of the second data group Y may include image data corresponding to the first image data $x_i$ and $x_j$ of the first data group X. A point (the first image data $x_i$ and $x_j$) corresponding to a point (the second image data $y_i$ and $y_j$) of the second data group Y may be extracted from the first data group X or a point (the second image data $y_i$ and $y_j$) corresponding to a point (the first image data $x_i$ and $x_j$) of the first data group X may be extracted from the second data group Y and the first data group X and the second data group Y may be matched with each other using the extracted point.

Matching of the first data group X with the second data group Y may be performed by the data matching module 20, as shown in FIG. 1.

As described above, the data acquisition module 10 may be a camera module. When the data acquisition module 10 is a camera module, the data acquisition module 10 may be an optical camera, an endoscope (e.g., a laparoscope and the like), a digital radiography, computed tomography scanning device, an optical camera for use in computer vision, or other like optical devices.

According to another example embodiment, the data acquisition module 10 may acquire image data regarding an object using radiation. For example, if the imaging device 1 is digital radiography or computed tomography, the data acquisition module 10 may include a radiation unit to irradiate an object and a radiation detector to receive radiation that has passed through the object and arrived thereat or directly arrived thereat and convert the radiation into an electrical signal. In such embodiments, the data acquisition module 10 can collect a plurality of pieces of radiation image data associated with the object, and transfer the collected radiation image data to the data matching module 20. As described above, when the data acquisition module 10 acquires the plurality of pieces of radiation image data associated with the object, the plurality of pieces of radiation image data may be obtained by photographing the object at different times and/or positions and classified based on the different times and/or positions. The plurality of pieces of radiation image data may form a plurality of different data groups X and Y.

According to another example embodiment, the data acquisition module 10 may acquire images of an object using sound waves, such as ultrasonic waves. For example, if the imaging device 1 is an ultrasonic imaging device, the data acquisition module 10 may include an ultrasonic transducer for applying ultrasonic waves to a target point inside an object, receive the ultrasonic waves, and convert the received ultrasonic waves into an electric signal. A collimation unit may be used to correct parallax of the electric signal output from the ultrasonic transducer and collimate the electric signal to generate an ultrasonic image signal. The data acquisition module 10 may generate a plurality of ultrasonic image signals and transfer the generated ultrasonic image signals to the data matching module 20. In this case, the data acquisition module 10 may acquire a plurality of ultrasonic image signals at different times or positions. The plurality of ultrasonic image signals at different times or positions may form a plurality of different data groups X and Y.

The data matching module 20 may receive data belonging to the plurality of data groups X and Y from the data acquisition module 10, match at least two of the received data groups, and output matching result data r, as shown in FIG. 1.

Referring back to FIG. 1, the data matching module 20 may include an input unit 21, a relational data calculator 22, an approximate calculator 23, a data determination unit 24, an alignment parameter calculator 25 and a matching unit 26 according to an example embodiment.

The input unit 21 of the data matching module 20 may receive a plurality of data pieces that form the plurality of data groups X and Y, such as the first data $x_i$ and $x_j$ or second data $y_i$ and $y_j$ from the data acquisition module 10. According to various embodiments, the input unit 21 may be a communication module capable of transmitting/receiving data to/from the external data acquisition module 10 according to a predetermined protocol.

The relational data calculator 22 may calculate at least one piece of relational data associated with the relationship between data belonging to the data groups X and Y. That is, the relational data calculator 22 calculates first relational data associated with the relationship between a plurality of pieces of first data $x_i$ and $x_j$ included in the first data group X and/or calculates second relational data regarding the relationship between a plurality of pieces of second data $y_i$ and $y_j$ included in the second data group Y.

Figure 4:
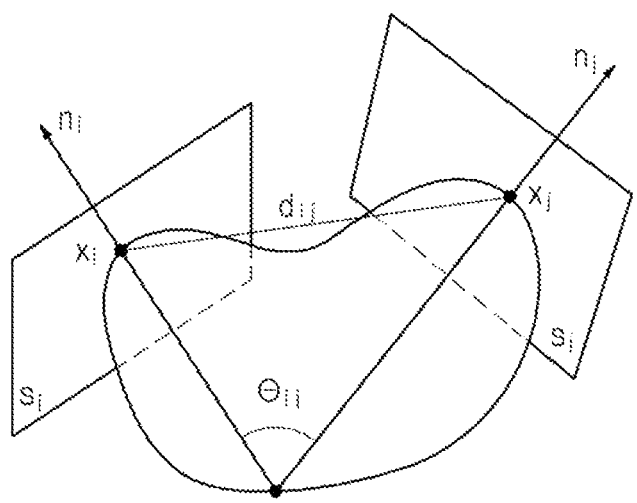
FIG. 4 is a view illustrating relational data according to an example embodiment.

FIG. 4 is a view illustrating relational data according to an example embodiment.

According to various embodiments, calculated relational data may be data regarding a geometric relationship between data. Specifically, relational data may be a distance d or an angle θ between at least two pieces of data $x_i$ and $x_j$ or $y_i$ and $y_j$ belonging to the same data group.

Referring to FIG. 4, the distance d between at least two pieces of data $x_i$ and $x_j$ or $y_i$ and y in the same data group can be defined as a Euclidian distance.

The angle θ between at least two pieces of data $x_i$ and $x_j$ or $y_i$ and $y_j$ in the same data group can be defined as an angle θ between at least two segments that respectively connect a predetermined reference point o and at least two pieces of data $x_i$ and $x_j$ or $y_i$ and $y_j$ in the same data group. Otherwise, the angle θ between at least two pieces of data $x_i$ and $x_j$ or $y_i$ and $y_j$ in the same data group may be defined as an angle θ between a normal vector $n_i$ at one of the first data $x_i$ and $x_j$ and a normal vector $n_j$ at the other first data $x_j$, as shown in FIG. 4. In this case, the normal vector $n_i$ may correspond to, or may be similar to the normal vector of a tangent plane $s_i$ calculated using neighboring data of the first data $x_i$. Additionally, the normal vector $n_j$ may correspond to, or be similar to the normal vector of a tangent plane $s_j$ calculated using neighboring data of the first data $x_j$.

According to various embodiments, the relational data calculator 22 may calculate the distance d and/or angle θ between at least two pieces of data $x_i$ and $x_j$ in the first data group X using only some of the plurality of pieces of first data $x_i$ and $x_j$ belonging to the first data group X. According to other embodiments, the relational data calculator 22 may calculate the distance d and/or angle θ between at least two pieces of data $x_i$ and $x_j$ in the first data group X using all of the plurality of pieces of first data $x_i$ and $x_j$ belonging to the first data group X.

Furthermore, the relational data calculator 22 may calculate the distance d and/or angle θ between at least two pieces of data $y_i$ and $y_j$ included in the second data group Y using all or some second data $y_i$ and $y_j$ belonging to the second data group Y.

The approximate calculator 23 may calculate an approximate value of the first relational data and/or the second relational data calculated by the relational data calculator 22. In such embodiments, the approximate calculator 23 may calculate approximate values of the first relational data that were calculated based on a plurality of pieces of data of a specific data group, such as the first data $x_i$ and $x_j$ of the first data group X from among relational data calculated by the relational data calculator 22. In this case, the approximate calculator 23 may calculate only approximate values with respect to some of the plurality of pieces of first relational data of the first data group X, for example. The approximate calculator 23 may calculate approximate values for all relational data calculated by the relational data calculator 22 according to various embodiments.

According to various embodiments, if relational data is a distance d between a plurality of pieces of data $x_i$ and $x_j$ or $y_i$ and $y_j$, the approximate calculator 23 can calculate an approximate value with respect to the distance d according to Equation 1.

$$d_{ij}^* = \omega_d\left(\text{floor}\left(\frac{d_{ij}}{\omega_d}\right) + \frac{1}{2}\right) = \omega_d\left(p + \frac{1}{2}\right) \quad \text{[Equation 1]}$$

Here, $d_{ij}^*$ denotes an approximate value of the distance d between two pieces of data $x_i$ and $x_j$, $\omega_d$ is an approximation coefficient with respect to the distance d and refers to the range of the approximated distance, and floor(•) denotes a floor function that calculates a result value when rounding off is performed on a given value. That is, the flooring function converts a given real number into the largest previous integer. In addition, $d_{ij}$ denotes the distance d between the two pieces of data $x_i$ and $x_j$.

Distances in a predetermined range can be approximated to the same value using $\omega_d$ and the flooring function. For example, if $\omega_d$ is 5 and relational data with respect to the distance d, calculated by the relational data calculator 22, is 1, the result of floor (•) is 0. Accordingly, the approximate value with respect to the distance d according to Equation 1 is 2.5. If the relational data corresponds to the range from 0 to 5, the approximate value of the distance according to Equation 1 becomes 2.5 which is the same as in the case of the relational data of 1. When the relational data of for the distances corresponds to the range from 5 to 10, the approximate value of the distance becomes 7.5. Accordingly, the range of distances having the same approximate value can be determined by the approximation coefficient $\omega_d$.

According to various embodiments, when relational data corresponds to an angle θ between a plurality of pieces of data $x_i$ and $x_j$ or $y_i$ and $y_j$, the approximate calculator 23 may calculate an approximate value of the angle θ according to Equation 2, for example.

$$\theta_{ij}^* = \omega_\theta\left(\text{floor}\left(\frac{\theta_{ij}}{\omega_\theta}\right) + \frac{1}{2}\right) = \omega_\theta\left(p + \frac{1}{2}\right) \quad \text{[Equation 2]}$$

Here, $\theta_{ij}^*$ denotes an approximate value of the angle θ between two pieces of data $x_i$ and $x_j$, $\omega_\theta$ is an approximation coefficient for the angle θ and refers to the range of the approximated angle, floor(•) denotes a floor function and $\theta_{ij}$ denotes the angle θ between the two pieces of data $x_i$ and $x_j$.

As described above, the range of angles having the same approximate value and the approximate value can be determined by the approximation coefficient $\omega_\theta$ using Equation 1.

According to various embodiments, the data determination unit 24 calculates a similarity between the first data group X and the second data group Y, and determines at least one piece of first data $x_i$ and $x_j$ of the first data group X and at least one piece of second data $y_i$ and $y_j$ of the second data group Y that correspond to each other, based on the calculated similarity.

The data determination unit 24 may calculate a similarity using the relational data calculated by the relational data calculator 22 and/or the approximate value calculated by the approximate calculator 23. For example, the data determination unit 24 can calculate similarity using at least one piece of first relational data and an approximate value of at least one piece of second relational data. Otherwise, the data determination unit 24 can calculate similarity using an approximate value of at least one piece of first relational data and at least one piece of second relational data. Furthermore, the data determination unit 24 can calculate similarity using an approximate value of at least one piece of first relational data and an approximate value of at least one piece of second relational data.

More specifically, according to various embodiments, the data determination unit 24 may calculate similarity measure data based on the first relational data and an approximate value of the second relational data, an approximate value of the first relational data and the second relational data, and/or an approximate value of the first relational data and an approximate data of the second relational data and calculate similarity using the similarity measure data.

The similarity measure data may be a set of a plurality of pieces of data calculated and/or acquired based on the first relational data and an approximate value of second relational data, an approximate value of the first relational data and the second relational data, and/or an approximate value of the first relational data and approximate data of the second relational data.

If first relational data associated with at least two pieces of first data $x_i$ and $x_j$ to be used for matching from among data included in the first data group X (e.g., the distance $d_{ij}$ and the angle $\theta_{ij}$ between two pieces of first data $x_i$ and $x_j$) correspond to second relational data associated with at least two pieces of second data $y_{i'}$ and $y_{j'}$ to be used for matching from among data included in the second data group Y, (e.g., the distance $d_{i'j'}$ and the angle $\theta_{i'j'}$ between two pieces of second data $y_{i'}$ and $y_{j'}$), then the first data $x_i$ and $x_j$ of the first data group X can be considered to correspond to the second data $y_{i'}$ and $y_{j'}$ of the second data group Y. Accordingly, based on this information representing whether data pieces correspond to each other or not, corresponding data of the first data group X and the second data group Y can be detected.

The similarity measure data may be used to calculate a similarity for extracting corresponding data of data groups using relational data, which represents the relationship between pieces of data included in each data group.

According to various embodiments, the similarity measure data may be distance similarity measure data calculated based on the distance between pieces of first data $x_i$ and $x_j$ and an approximate value of the distance between pieces of second data $y_i$ and $y_j$ or based on an approximate value of the distance between the pieces of first data $x_i$ and $x_j$ and the distance between the pieces of second data $y_i$ and $y_j$. The distance similarity measure data may be calculated based on an approximate value of the distance between the pieces of first data $x_i$ and $x_j$ and an approximate value of the distance between the pieces of second data $y_i$ and $y_j$.

According to other embodiments, the similarity measure data may be an angle similarity measure data calculated based on the angle between pieces of first data $x_i$ and $x_j$ and an approximate value of the angle between pieces of second data $y_i$ and $y_j$. The angle similarity measure data may be calculated based on an approximate value of the angle between the pieces of first data $x_i$ and $x_j$ and the angle between the pieces of second data $y_i$ and $y_j$ and/or based on an approximate value of the angle between the pieces of first data $x_i$ and $x_j$ and an approximate value of the angle between the pieces of second data $y_i$ and $y_j$.

According to other embodiments, the similarity measure data may be calculated using the above-described distance similarity measure data and angle similarity measure data. For example, the similarity measure data may be calculated by summing the distance similarity measure data and angle similarity measure data.

According to other embodiments, the similarity measure data may be at least one piece of predetermined and/or desired base data and index data corresponding to information about the base data. Here, the predetermined base data may be data used to calculate similarity for extracting pieces of data corresponding to each other from data groups using relational data representing the relationship between pieces of data belonging to each data group.

The above-described similarity measure data may be represented as a predetermined matrix. Similarity measure data represented as a matrix may be referred to as a similarity matrix.

According to various embodiments, the distance similarity measure data may be represented as a distance similarity matrix and the angle similarity measure data may be represented as an angle similarity matrix.

It is assumed that the number of pieces of first data $x_i$ and $x_j$ to be used for matching from among data included in the first data group X is $n_x$ and the number of pieces of second data $y_{i'}$ and $y_{j'}$ to be used for matching from among data included in the second data group Y is $n_y$. Here, i may be an integer in the range of 0 to $n_x$ and i' may be an integer in the range of 0 to $n_y$. In this case, distance similarity measure data can be represented as a distance similarity matrix of $n_x \cdot n_y \times n_x \cdot n_y$ and angle similarity measure data can be represented as an angle similarity matrix of $n_x \cdot n_y \times n_x \cdot n_y$. For example, if the number of pieces of first data $x_i$ and $x_j$ and the number of pieces of second data $y_{i'}$ and $y_{j'}$ are given as 5, the distance similarity matrix corresponding to the distance similarity measure data and the angle similarity matrix corresponding to the angle similarity measure data can be represented as a 25×25 matrix. According to various embodiments, the distance similarity matrix D can be defined as represented by Equation 3.

$$D = \begin{bmatrix} 0 & D_{12} & \cdots & D_{1n_x} \\ D_{21} & 0 & \cdots & D_{2n_x} \\ \vdots & \vdots & \ddots & \vdots \\ D_{n_x 1} & D_{n_x 2} & \cdots & 0 \end{bmatrix} \quad \text{[Equation 3]}$$

Here, $D_{ij}$ denotes a matrix having a predetermined and/or desired size. In other words, the distance similarity matrix D may be composed of a combination of at least one block matrix $D_{ij}$. More specifically, diagonal elements of the distance similarity matrix D may correspond to 0 and other elements thereof may correspond to the block matrix $D_{ij}$.

According to various embodiments, the at least one block matrix $D_{ij}$ may be an $n_y \times n_y$ matrix. The number of columns and the number of rows of the distance similarity matrix D may be $n_x$. In this case, the size of the distance similarity matrix D can be $n_x \cdot n_y \times n_x \cdot n_y$.

According to various embodiments, if the distance similarity matrix D is calculated based on an approximate value of the distance between pieces of first data $x_i$ and $x_j$ and the distance between pieces of second data $y_i$ and $y_j$, the (i', j')-th element of the block matrix $D_{ij}$ in the distance similarity matrix D of Equation 3 can be defined as represented by Equation 4.

$$D_{ij}(i', j') = \begin{bmatrix} K - \dfrac{(d_{ij}^* - d_{i'j'})^2}{a\sigma_d^2} & \text{if } |d_{ij}^* - d_{i'j'}| < b\sigma_d \\ 0 & \text{otherwise} \end{bmatrix} \quad \text{[Equation 4]}$$

Here, $D_{ij}(i', j')$ is the (i', j')-th element value of the block matrix $D_{ij}$ and K is a predetermined constant. The constant K may be predetermined according to the needs of a user or system designer. For example, the constant K can be set to 4.5.

In addition, $d_{ij}*$ denotes an approximate value of the distance between the first data $x_i$ and $x_j$ of the first data group X and $d_{i'j'}$ refers to the distance between the second data $y_i$ and $y_j$ of the second data group Y.

In Equation 4, a and b are predetermined and/or desired constants. The constants a and b may be predetermined according to the needs of the user or system designer. For example, a can be set to 2 and b can be set to 3.

In addition, $\sigma_d$ denotes an allowable error range coefficient with respect to a distance between pieces of data. In other words, $\sigma_d$ refers to a fundamental unit for a difference that may be generated between an approximate value of the distance between the pieces of first data $x_i$ and $x_j$ and the distance between the pieces of second data $y_i$ and $y_j$. That is, $\sigma_d$ represents an error allowance range when the approximate value of the distance between the pieces of first data $x_i$ and $x_j$ is compared with the distance between the pieces of second data $y_i$ and $y_j$. In Equation 4, $b\sigma_d$ refers to an allowable error range that may be generated between the approximate value of the distance between the first data $x_i$ and the distance between the second data $y_i$ and $y_j$ and B is a constant that may be predetermined according to the need of the user or system designer.

According to Equation 4, the value of the (i', j')-th element of the block matrix $D_{ij}$ of the distance similarity matrix D can be determined according to Equation 5 if the difference between the approximate value of the distance between the first data $x_i$ and $x_j$ and the distance between the second data $y_i$ and $y_j$ is less than a predetermined allowable error range, for example, $3\sigma_d$ (b=3).

$$K - \frac{(d_{ij}^* - d_{i'j'})^2}{a\sigma_d^2} \quad \text{[Equation 5]}$$

Here, a maximum value of the (i', j')-th element of the block matrix $D_{ij}$ is K. If K is determined as 4.5, and no error is present between the approximate value of the distance between the first data $x_i$ and $x_j$ and the distance between the second data $y_i$ and $y_j$, (i.e., an error value is 0), then the maximum value of the (i', j')-th element of the block matrix $D_{ij}$ is 4.5.

According to Equation 4, the value of the (i', j')-th element of the block matrix $D_{ij}$ of the distance similarity matrix D becomes 0 if the difference between the approximate value of the distance between the first data $x_i$ and $x_j$ and the distance between the second data $y_i$ and $y_j$ is greater than a predetermined allowable error range, for example, $3\sigma_d$ (b=3).

According to various embodiments, the angle similarity matrix A can be defined according to Equation 6.

$$A = \begin{bmatrix} 0 & A_{12} & \cdots & A_{1n_x} \\ A_{21} & 0 & \cdots & A_{2n_x} \\ \vdots & \vdots & \ddots & \vdots \\ A_{n_x1} & A_{n_x2} & \cdots & 0 \end{bmatrix} \quad \text{[Equation 6]}$$

Here, $A_{ij}$ denotes a matrix having a predetermined size. The angle similarity matrix A may be composed of a combination of at least one block matrix $A_{ij}$ in the same manner as the distance similarity matrix D. More specifically, diagonal elements of the angle similarity matrix D may be 0 and other elements thereof may correspond to the block matrix $A_{ij}$.

At least one block matrix $A_{ij}$ may be an $n_y \times n_y$ matrix. If the number of columns and the number of rows of the angle similarity matrix A are $n_x$, the size of the angle similarity matrix A can be $n_x \cdot n_y \times n_x \cdot n_y$.

The angle similarity matrix A may be calculated based on an approximate value of the angle between pieces of first data $x_i$ and $x_j$ and the angle between pieces of second data $y_i$ and $y_j$, similarly to the distance similarity matrix D. In this case, the (i', j')-th element of the predetermined block matrix $A_{ij}$ in the angle similarity matrix A of Equation 6 can be defined as represented by Equation 7, for example.

$$A_{ij}(i', j') = \begin{bmatrix} K - \frac{(\theta_{ij}^* - \theta_{i'j'})^2}{a\sigma_\theta^2} & \text{if } |\theta_{ij}^* - \theta_{i'j'}| < b\sigma_\theta \\ 0 & \text{otherwise} \end{bmatrix} \quad \text{[Equation 7]}$$

In Equation 7, $A_{ij}(i', j')$ is the (i', j')-th element value of the block matrix $A_{ij}$ and K is a desired constant that may be predetermined according to the needs of the user or system designer. According to an embodiment, the constant K may be 4.5.

In addition, $\theta_{ij}*$ denotes an approximate value of the angle between the first data $x_i$ and $x_j$ of the first data group X, and $\theta_{i'j'}$ refers to the angle between the second data $y_i$ and $y_j$ of the second data group Y.

Similar to the distance similarity matrix D, a and b are constants that can be predetermined according to the needs of the user or system designer. According to various embodiments, a may be set to 2 and b may be set to 3.

In addition, $\sigma_\theta$ denotes an allowable error range coefficient for an angle between pieces of data. That is, $\sigma_\theta$ refers to a fundamental unit for an allowable error range between an approximate value of the angle between the pieces of first data $x_i$ and $x_j$ and the angle between the pieces of second data $y_i$ and $y_j$. Furthermore, $b\sigma_\theta$ refers to an allowable range of error that may be generated between the approximate value of the angle between the first data $x_i$ and the angle between the plural pieces of second data $y_i$ and $y_j$.

According to Equation 7, the value of the (i', j')-th element of the block matrix $A_{ij}$ of the angle similarity matrix A can be determined according to Equation 8 if the approximate value of the angle between the first data $x_i$ and $x_j$ and the angle between the second data $y_i$ and $y_j$ is less than a predetermined allowable error range, for example, $3\sigma_\theta$ (b=3).

$$K - \frac{(\theta_{ij}^* - \theta_{i'j'})^2}{a\sigma_\theta^2} \quad \text{[Equation 8]}$$

Here, a maximum value of the (i', j')-th element of the block matrix $A_{ij}$ may correspond to K. When little or no error is present between the approximate value of the angle between the first data $x_i$ and $x_j$ and the angle between the second data $y_i$ and $y_j$, that is, an error value is 0, the (i', j')-th element of the block matrix $A_{ij}$ has a maximum value. If K is set to 4.5, the maximum value of the (i', j')-th element of the block matrix $A_{ij}$ becomes 4.5.

According to Equation 7, the value of the (i', j')-th element of the block matrix $A_{ij}$ of the angle similarity matrix A can be determined as 0 if the difference between the approximate value of the angle between the first data $x_i$ and $x_j$ and the angle between the second data $y_i$ and $y_j$ is greater than a predetermined ad/or desired allowable error range, for example, $3\sigma_\theta$ (b=3).

A similarity matrix G as an example of similarity measure data may be determined by the distance similarity matrix D and the angle similarity matrix A. Specifically, the similarity matrix G has a size of $n_x \cdot n_y \times n_x \cdot n_y$ and may be calculated as the sum of the distance similarity matrix D and the angle similarity matrix A, as represented by Equation 9.

$$G = D + A \quad \text{[Equation 9]}$$

According to various embodiments, the data determination unit 24 may calculate the distance similarity matrix D, the angle similarity matrix A or the similarity matrix G and calculate similarity regarding the first data group X and the second data group Y using the calculated distance similarity matrix D, angle similarity matrix A or similarity matrix G.

According to various embodiments, the similarity measure data may be at least one piece of predetermined and/or desired base data and index data that corresponds to information about the base data. The base data and the index data may also be represented as matrices. It is assumed that base data represented as a matrix is referred to as a base matrix B and index data represented as a matrix is referred to as an index matrix H.

If the base data and index data are represented as matrices, the distance similarity matrix B, the angle similarity matrix A and the similarity matrix G may be calculated using the base matrix B and the index matrix H.

In this case, the base matrix B may include information about values of elements of a predetermined matrix, for example, the distance similarity matrix D, the angle similarity matrix A and the similarity matrix G. The index matrix H may indicate the position of the base matrix B in a predetermined matrix, for example, the distance similarity matrix D, the angle similarity matrix A and the similarity matrix G.

According to various embodiments, the base matrix B may be acquired using an approximate value of relational data regarding a predetermined data group and relational data regarding a different data group. Furthermore, the base matrix B may be acquired using an approximate value of relational data regarding a predetermined and/or desired data group and an approximate value of relational data regarding a different data group.

The index matrix H may be obtained based on an approximate value of relational data regarding a predetermined and/or desired data group.

A base matrix of the distance similarity matrix D may be referred to as a distance base matrix, a base matrix of the angle similarity matrix A may be referred to as an angle base matrix, an index matrix of the distance similarity matrix D may be referred to as a distance index matrix and an index matrix of the angle similarity matrix A may be referred to as an angle index matrix.

According to various embodiments, a distance base matrix $B_D$ may include at least one unique block matrix $B_D^{(p)}$ ($0 \leq p \leq m-1$) with respect to the distance similarity matrix D. Here, m denotes the number of distance base matrices $B_D$. When the distance base matrix $B_D^{(p)}$ is a unique block matrix of the distance similarity matrix D, the number of distance base matrices $B_D^{(p)}$, m, may be given as $d_{max}/\omega_d$. Here, $d_{max}$ represents a maximum value of distances $d_{ij}$ between data in the first data group X. Specifically, a total of m distance approximate values $d_{ij}*$ can be acquired from the first data group X and m unique block matrices $B_D^{(p)}$ can be generated according to Equation 4. In other words, m distance base matrices $B_D^{(p)}$ can be acquired for the distance similarity matrix D. The distance base matrix $B_D$ can be calculated by Equation 1 according to various embodiments.

According to various embodiments, a distance index matrix $H_D$ may indicate the position of the distance base matrix $B_D$ in the distance similarity matrix. Specifically, the (i, j)-th element value $H_D(i, j)$ of the distance index matrix $H_D$ can be determined as 1 when the block matrix $D_{ij}$ of the distance similarity matrix D is similar or identical to the distance base matrix $B_D^{(p)}$. The (i, j)-the element value $H_D(i, j)$ of the distance index matrix $H_D$ can be determined as 0 when the block matrix $D_{ij}$ of the distance similarity matrix D is different from the distance base matrix $B_D^{(p)}$. That is, the distance index matrix $H_D$ may be a matrix composed of 0 and 1. The distance index matrix $H_D$ may also include at least one block matrix $H_D^{(p)}$ ($0 \leq p \leq m-1$). The distance index matrix $H_D$ may be calculated using the distance approximate value $d_{ij}*$.

The distance base matrix $B_D$ and the distance index matrix $H_D$ may have a size of $n_x \times n_x$ or $n_y \times n_y$ according to various embodiments.

When the distance base matrix $B_D$ and the distance index matrix $H_D$ are given as described above, the distance similarity matrix D can be given as the Kronecker product of the distance base matrix $B_D$ and the distance index matrix $H_D$, as represented by Equation 10.

$$D = \sum_{p=0}^{m-1} H_D^{(p)} \otimes B_D^{(p)} \quad \text{[Equation 10]}$$

The Kronecker product $H_D^{(p)} \otimes B_D^{(p)}$ of the distance base matrix $B_D$ and the distance index matrix $H_D$ can be given as represented by Equation 11.

$$H_D^{(p)} \otimes B_D^{(p)} = \begin{bmatrix} H_D^{(p)}(1,1)B_D^{(p)} & H_D^{(p)}(1,2)B_D^{(p)} & \cdots & H_D^{(p)}(1,n_X)B_D^{(p)} \\ H_D^{(p)}(2,1)B_D^{(p)} & H_D^{(p)}(2,2)B_D^{(p)} & \cdots & H_D^{(p)}(2,n_X)B_D^{(p)} \\ \vdots & \vdots & \vdots & \vdots \\ H_D^{(p)}(n_X,1)B_D^{(p)} & H_D^{(p)}(n_X,2)B_D^{(p)} & \cdots & H_D^{(p)}(n_X,n_X)B_D^{(p)} \end{bmatrix} \quad \text{[Equation 11]}$$

In this case, the Kronecker product $H_D^{(p)} \otimes B_D^{(p)}$ of the distance base matrix $B_D$ and the distance index matrix $H_D$ may have a size of $n_x \cdot n_y \times n_x \cdot n_y$ as expressed by Equation 11.

According to various embodiments, an angle base matrix $B_A$ may include at least one unique block matrix $B_A^{(q)}$ ($0 \leq q \leq n-1$) with respect to the angle similarity matrix A. Here, n denotes the number of angle base matrices $B_A$. When the angle base matrix $B_A^{(q)}$ is a unique block matrix of the angle similarity matrix A, n angle base matrices $B_A^{(q)}$ can be acquired for the angle similarity matrix A. The number of angle base matrices $B_A^{(q)}$, n, may be given as $\theta_{max}/\omega_\theta$. Here, $\theta_{max}$ represents a maximum value of angles $\theta_{ij}$ between data in the first data group X. The angle base matrix $B_A$ can be calculated by Equation 1 according to various embodiments.

According to various embodiments, the angle index matrix $H_A$ can indicate the position of the angle base matrix $B_A$ in the angle similarity matrix. According to some embodiments, the (i, j)-th element value $H_A(i, j)$ of the angle index matrix $H_A$ can be determined as 1 when the block matrix $A_{ij}$ of the angle similarity matrix A is identical to the angle base matrix $B_A^{(q)}$. The (i, j)-the element value $H_A(i, j)$ of the angle index matrix $H_A$ can be determined as 0 when the block matrix $A_{ij}$ of the angle similarity matrix A is different from the angle base matrix $B_A^{(q)}$. That is, the angle index matrix $H_A$ may be a matrix composed of 0 and 1, like the distance index matrix $H_D$. The angle index matrix $H_A$ may also include at least one block matrix $H_A^{(q)}$ ($0 \le q \le m-1$). The angle index matrix $H_A$ may be calculated using an angle approximate value $\theta_{ij}^*$.

The angle base matrix $B_A$ and the angle index matrix $H_A$ may have a size of $n_x \times n_x$ or $n_y \times n_y$ according to various embodiments.

The angle similarity matrix A can be represented as the Kronecker product of the angle base matrix $B_A$ and the angle index matrix $H_A$ according to Equation 12.

$$A = \sum_{q=0}^{n-1} H_A^{(q)} \otimes B_A^{(q)} \qquad \text{[Equation 12]}$$

The Kronecker product $H_D^{(p)} \otimes B_A^{(q)}$ of the angle base matrix $B_A$ and the angle index matrix $H_A$ can be given as represented by Equation 13, similar to the Kronecker product $H_D^{(p)} \otimes B_D^{(p)}$ of the distance base matrix $B_D$ and the distance index matrix $H_D$.

$$H_A^{(q)} \otimes B_A^{(q)} = \begin{bmatrix} H_A^{(q)}(1,1)B_A^{(q)} & H_A^{(q)}(1,2)B_A^{(q)} & \cdots & H_A^{(q)}(1,n_X)B_A^{(q)} \\ H_A^{(q)}(2,1)B_A^{(q)} & H_A^{(q)}(2,2)B_A^{(q)} & \cdots & H_A^{(q)}(2,n_X)B_A^{(q)} \\ \vdots & \vdots & \vdots & \vdots \\ H_A^{(q)}(n_X,1)B_A^{(q)} & H_A^{(q)}(n_X,2)B_A^{(q)} & \cdots & H_A^{(q)}(n_X,n_X)B_A^{(q)} \end{bmatrix} \qquad \text{[Equation 13]}$$

The Kronecker product $H_D^{(p)} \otimes B_A^{(q)}$ of the angle base matrix $B_A$ and the angle index matrix $H_A$ may have a size of $n_x \cdot n_y \times n_x \cdot n_y$.

According to various embodiments, the data determination unit 24 may calculate similarity by computing only the distance base matrix $B_D$ and distance index matrix $H_D$ or only the angle base matrix $B_A$ and angle index matrix $H_A$ without calculating the distance similarity matrix D or the angle similarity matrix A in the same manner as computation of similarity using a similarity matrix.

The data determination unit 24 may calculate the similarity measure data, (e.g., the distance similarity matrix D, the angle similarity matrix A, the similarity matrix G, the distance base matrix $B_D$ or angle base matrix $B_A$ and the distance index matrix $H_D$ or angle index matrix $H_A$) and then compute a similarity based on the calculated similarity measure data.

In order to acquire the similarity, the data determination unit 24 may calculate a principal eigenvector of the similarity matrix, base matrix, and/or index matrix, which corresponds to similarity measure data.

According to various embodiments, the data determination unit 24 may calculate the principal eigenvector of the similarity matrix, base matrix, and/or index matrix using a power method. The power method is a method for repeatedly computing a predetermined matrix and a predetermined vector until the predetermined vector is converged to acquire a converged vector. In this case, the predetermined vector used for initial computation may be a randomly selected vector. In some embodiments, the predetermined vector used for initial computation may be a normalized vector. It is possible to determine whether a vector is converged or not by normalizing a vector acquired by computing a predetermined and/or desired matrix and a predetermined and/or desired vector, comparing the normalized vector with the predetermined vector and determining whether the difference between the normalized vector and the predetermined vector is less than a predetermined and/or desired constant. The converged vector acquired according to the power method becomes the principal eigenvector of the matrix.

For example, the principal eigenvector may be acquired by normalizing results of repeated computation of Equation 14.

$$v^{(i)} = Gv^{(i-1)} \qquad \text{[Equation 14]}$$

Specifically, $v^{(i)}$ is repeatedly calculated from $v^{(1)}$ to acquire $v^{(i)}$ having a difference from $v^{(i-1)}$, which is less than a predetermined and/or desired constant. The acquired $v^{(i)}$ becomes the principal eigenvector. Similarity between first data $x_i$ of the first data group X and second data $y_i$ of the second data group Y can be calculated based on the principal eigenvector calculated through the above-mentioned process.

According to various embodiments, Equation 15 may be used to calculate the principal eigenvector.

$$Gv = (D+A)v = Dv + A \qquad \text{[Equation 15]}$$

According to Equation 15, the similarity matrix G can be represented as the sum of the distance similarity matrix D and the angle similarity matrix A. Accordingly, it is possible to acquire the distance similarity matrix D and the angle similarity matrix A and calculate principal eigenvectors using the distance similarity matrix D and the angle similarity matrix A without acquiring the similarity matrix G.

According to various embodiments, it is possible to acquire the principal eigenvector with respect to the distance similarity matrix D and the principal eigenvector with respect to the angle similarity matrix A according to Equation 14 and sum the acquired two main eigenvectors to obtain the summed principal eigenvector. The similarity can be calculated based on the summed principal eigenvector.

Equation 15 can be modified into Equation 16.

$$\begin{aligned} Gv &= Dv + Av \\ &= \left(\sum_{p=0}^{m-1} H_D^{(p)} \otimes B_D^{(p)}\right)v + \left(\sum_{q=0}^{n-1} H_A^{(q)} \otimes B_A^{(q)}\right)v \\ &= \sum_{p=0}^{m-1} (H_D^{(p)} \otimes B_D^{(p)})v + \sum_{q=0}^{n-1} (H_A^{(q)} \otimes B_A^{(q)})v \end{aligned} \qquad \text{[Equation 16]}$$

According to Equation 16, it is possible to calculate the principal eigenvector using the index matrix and the base matrix of each of the distance similarity matrix D and the angle similarity matrix A without computing the similarity matrix G, the distance similarity matrix D and the angle similarity matrix A. When the principal eigenvector is calculated using the index matrix and the base matrix of each of the distance similarity matrix D and the angle similarity matrix A without acquiring the similarity matrix G, only part of the similarity matrix G is constituted using the Kronecker product of the distance index matrix $H_D^{(p)}$ and the distance base matrix $B_D^{(p)}$ and the Kronecker product of the angle index matrix $H_A^{(q)}$ and the angle base matrix $B_A^{(q)}$ and multiplied by a vector v, and thus the similarity matrix G can be multiplied by the vector v without constituting the whole similarity matrix G. Accordingly, it is possible to reduce computational load and storage capacity when computations are performed using the index matrix and base matrix.

The data determination unit 24 can acquire the principal eigenvector as described above. Upon acquisition of the principal eigenvector, the data determination unit 24 extracts matching points of the first data group X and the second data group Y from the principal eigenvector. Each element of the acquired principal eigenvector refers to similarity between the first data x, of the first data group X and the second data y, of the second data group Y.

Figure 5:
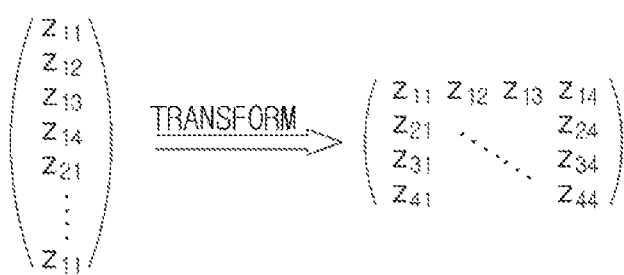

FIGS. 5, 6 and 7 illustrate a method of detecting matched data based on similarity according to an example embodiment. FIG. 5 is a view for illustrating a method of converting the principal eigenvector into a matrix and FIGS. 6 and 7 illustrate a method of detecting data corresponding to each other based on a similarity.

According to various embodiments, the principal eigenvector can be represented as an $n_A n_B \times 1$ matrix as shown in the left of FIG. 5. When the principal eigenvector is modified to an $n_A \times n_B$ matrix as shown in the right side of FIG. 5, a similarity matrix including information about similarity can be acquired. Specifically, the (i, i')-th element of the similarity matrix represents a similarity between predetermined and/or desired first data $x_i$ of the first data group X and predetermined and/or desired second data $y_{i'}$ of the second data group Y, that is, a similarity value. Referring to FIG. 6, a similarity between a first piece $x_1$ of the first data of the first data group X and a first piece $y_1$ of the second data of the second data group Y can have a similarity value of $z_{11}$. A similarity between a third piece $x_3$ of the first data of the first data group X and a fourth piece $y_4$ of the second data of the second data group Y can have a similarity value of $z_{43}$. The predetermined first data $x_i$ of the first data group X and the predetermined second data $y_{i'}$ of the second data group Y become more similar to each other as the similarity value increases. Accordingly, corresponding points of the first data group X and the second data group Y can be detected according to similarity value.

FIG. 7 illustrates an exemplary similarity matrix according to an example embodiment. Referring to FIG. 7, elements of the first column represent similarities between pieces $x_1$ to $x_4$ of the first data of the first data group X and the first piece of the second data $y_1$ of the second data group Y. It can be known from FIG. 7 that similarity between the first piece $x_1$ of the first data and the first piece $y_1$ of the second data is 4.5 and similarity between the second piece $x_2$ of the first data and the first piece $y_1$ of the second data is 0.2. In this case, similarity between the first piece $x_1$ of the first data and the first piece $y_1$ of the second data is 4.5, which is greater than other similarity values. Accordingly, it can be determined that the first piece $x_1$ of the first data and the first piece $y_1$ of the second data are more similar to each other relative to other pieces of data. The similarity between the second piece $x_2$ of the first data and the first piece $y_1$ of the second data is 0.2 and thus it can be determined that the second piece $x_2$ of the first data and the first piece $y_1$ of the second data are less similar to each other relative to other pieces of data. When larger similarity values are extracted from the similarity matrix of FIG. 7 in the above-described manner, the extracted similarity values can be 4.5, 4.1, 4.3 and 3.9 ($z_{11}$, $z_{22}$, $z_{33}$ and $z_{44}$ of FIG. 6). Accordingly, it can be determined that the first piece $x_1$ of the first data and the first piece $y_1$ of the second data are similar to each other, the second piece $x_2$ of the first data and the second piece $y_2$ of the second data are similar to each other, the third piece $x_3$ of the first data and the third piece $y_3$ of the second data are similar to each other, and the fourth piece $x_4$ of the first data and the fourth piece $y_4$ of the second data are similar to each other. In other words, it can be determined that the first piece $x_1$ of the first data and the first piece $y_1$ of the second data correspond to each other, the second piece $x_2$ of the first data and the second piece $y_2$ of the second data correspond to each other, the third piece $x_3$ of the first data and the third piece $y_3$ of the second data correspond to each other, and the fourth piece $x_4$ of the first data and the fourth piece $y_4$ of the second data correspond to each other. Therefore, at least one piece of corresponding data can be determined and detected from the first data group X and the second data group Y.

According to various embodiments, the data determination unit 24 may detect a plurality of pieces of corresponding data from the first data group X and the second data group Y by applying Bipartite graph matching such as the Hungarian method to the acquired similarity matrix.

The data determination unit 24 can detect a plurality of pieces of corresponding data from plural data groups X and Y according to the above-mentioned method.

Referring back to FIG. 1, a plurality of pieces of corresponding data determined and detected by the data determination unit 24 are transferred to the alignment parameter calculator 25. The alignment parameter calculator 25 calculates an appropriate parameter based on the plural pieces of corresponding data transferred thereto.

The relationship between plural pieces of corresponding data, for example, the relationship between the first data $x_i$ and the second data $y_i$ corresponding to each other can be represented by the following equation.

$$y_i = R \cdot x_i + t \qquad \text{[Equation 17]}$$

Here, R and t are alignment parameters. R refers to a rotational matrix and t refers to a dislocation vector. In other words, when $x_i$ is rotated according to R and moved by t, $x_i$ is matched to $y_i$.

Since $x_i$ and $y_i$ are the first data and the second data which are known values, an appropriate rotational matrix R and an appropriate dislocation vector t can be calculated using least square method (LSM). That is, appropriate alignment parameters can be acquired by performing regression analysis on $x_i$ and $y_i$.

The matching unit 26 matches the first data group X and the second data group Y with each other using predetermined and/or desired alignment parameters obtained by the alignment parameter calculator 25. According to various embodiments, the matching unit 26 may perform local matching using the predetermined alignment parameters. For example, the matching unit 26 can calculate more accurate alignment parameters than the alignment parameters acquired by the alignment parameter calculator 25 using an iterative closest point (ICP) method and perform local matching using the calculated alignment parameters.

Figure 8:
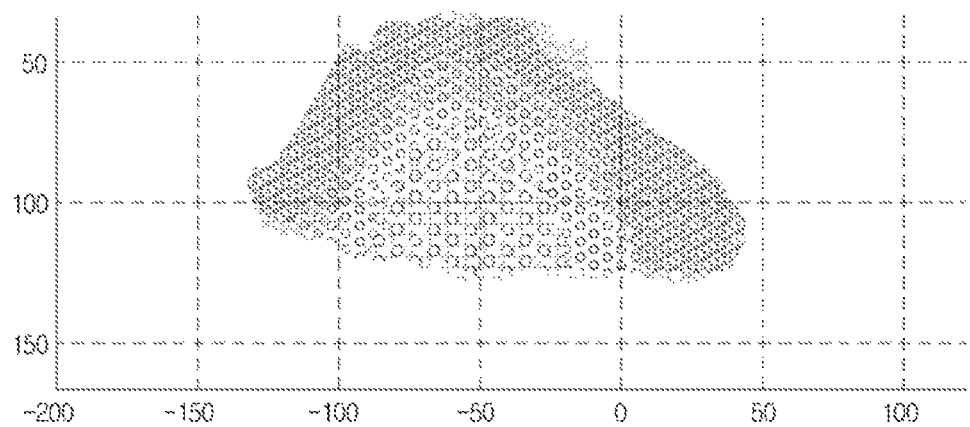
FIG. 8 illustrates a matched data group according to an example embodiment.

FIG. 8 illustrates a matched data group according to an example embodiment. The first data group X and the second data group Y can be matched using the predetermined alignment parameters acquired by the matching unit 26 to obtain the matched data group as shown in FIG. 8.

The above-described data acquisition module 10 and the data matching module 20 may be set in one device or distributed to different devices. For example, the data acquisition module 10 can be disposed in an image capturing device such as a camera and the data matching module 20 can be disposed in a workstation capable of transmitting/receiving data to/from the image capturing device through a wired/wireless network.

Figure 9:
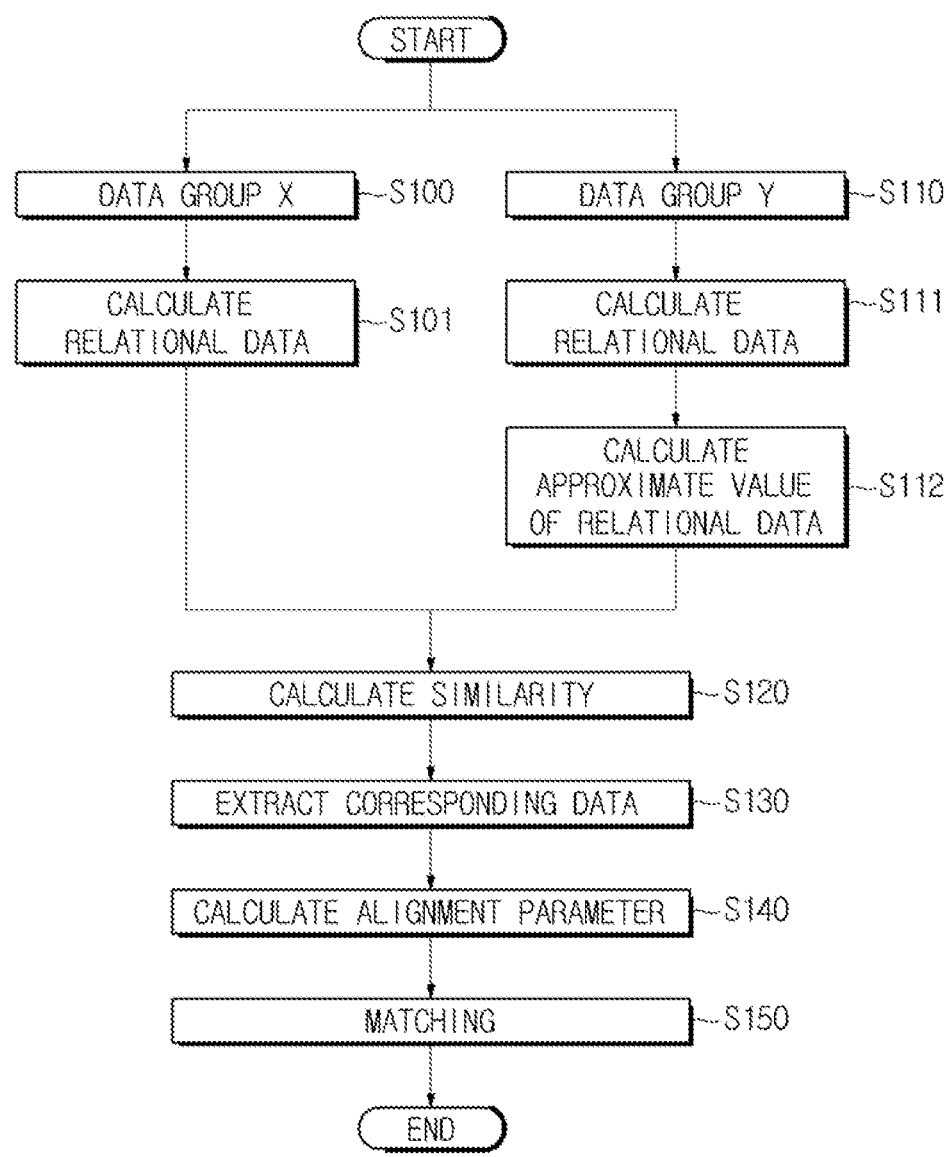
FIG. 9 is a flowchart illustrating a data matching method according to an example embodiment.

FIG. 9 is a flowchart illustrating the data matching method according to an example embodiment.

Referring to FIG. 9, as shown in operation S100, a first data group X is acquired. Upon acquisition of the first data group X, first relational data regarding at least one piece of first data of the first data group X may be calculated, as shown in operation S101. Here, the first relational data may be the distance and/or angle between plural pieces of first data.

As shown in operation S110, a second data group Y is acquired. As shown in FIG. 9, the second data group Y is acquired at the same time as data group X. However, in some embodiments, the second data group Y may be acquired at a different time as data group X (not shown). When the second data group Y is acquired at the same time as step S100 or at a different time, second relational data regarding at least one piece of second data of the second data group Y may be calculated, as shown in operation S111. The second relational data may be the distance or angle between plural pieces of the second data. Upon calculation of the second relational data regarding the second data, an approximate value of the second relational data is calculated, as shown in operation S112. In this case, the approximate value of the second relational data may be calculated using Equation 1 and/or Equation 2, as discussed above.

As shown in operation S120, a similarity between at least one piece of the first data of the first data group X and at least one piece of the second data of the second data group Y may be calculated using the first relational data and the approximate value of the second relational data.

As shown in operation S130, corresponding data is extracted. First data and second data that may correspond to each other, from among at least one piece of the first data of the first data group X and at least one piece of the second data of the second data group Y, can be determined using the calculated similarity. In this case, the first data and second data that can correspond to each other may be determined by detecting at least one piece of the second data of the second data group Y, which corresponds to at least one piece of the first data of the first data group X.

As shown in operation S140, alignment parameters are calculated. Predetermined and/or desired alignment parameters may be calculated based on the corresponding first data and second data. The alignment parameters may be parameters for rotating or moving at least one of the first and second data groups X and Y. More specifically, the alignment parameters may be a rotational matrix and/or a dislocation vector.

As shown in operation S150, the first data group X and the second data group Y are matched using the acquired alignment parameters. Consequently, the data groups X and Y can be matched, as discussed above with respect to FIGS. 5-7.

Figure 10:
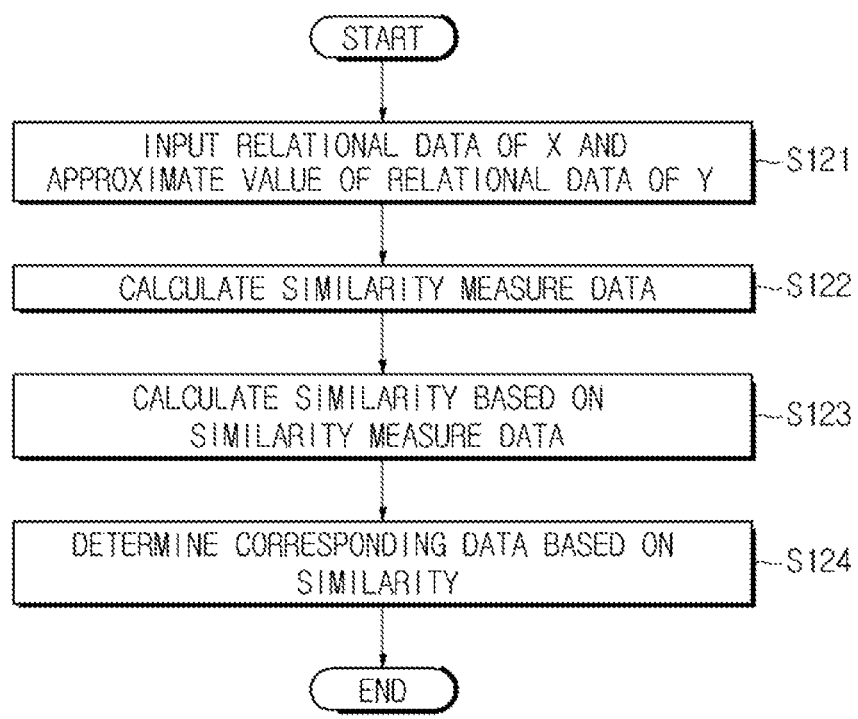
FIG. 10 is a flowchart illustrating a data determination method according to an example embodiment.

FIG. 10 is a flowchart illustrating a data determination method according to an example embodiment. The method as shown in FIG. 10 may be used for determining the first data and second data that can correspond to each other.

As shown in operation S121, relation data of X and an approximate value of relation data of Y are input. Upon input of the first relational data of the first data group X and the second relational data of the second data group Y, similarity measure data is calculated using the first relational data of the first data group X and an approximate value of the second relational data of the second data group Y, as shown in operation S122. According to various embodiments, a similarity matrix, a distance similarity matrix, or an angle similarity matrix may be calculated as the similarity measure data. Both the distance similarity matrix and the angle similarity matrix may be calculated as the similarity measure data as necessary. In addition, base data and index data may be calculated as the similarity measure data. In this case, distance base data or angle base data may be calculated as the base data and distance index data or angle index data may be calculated as the index data. According to various embodiments, only the distance base data and distance index data is calculated, or only the angle base data and angle index data is calculated. Otherwise, all of the distance base data, distance index data, angle base data, and angle index data may be calculated.

As shown in operation S123, a similarity is calculated based on the similarity measure data. According to various embodiments, when the similarity measure data is represented as a predetermined matrix (i.e., when the similarity measure data corresponds to the distance similarity matrix, the angle similarity matrix, or base data and index data represented as matrices), similarity may be computed by calculating a principal eigenvector of a predetermined and/or desired matrix. In this case, the principal eigenvector of the predetermined matrix can be calculated using a product method. Upon calculation of the principal eigenvector, each element of the principal eigenvector can indicate similarity between the first data of the first data group X and the second data of the second data group Y.

As shown in operation S124, corresponding data from among the first data of the first data group X and the second data of the second data group Y is determined. In various embodiments, the determination may be based on the calculated similarity, for example, the elements of the principal eigenvector. Consequently, corresponding data of the first data group X and the second data group Y can be determined.

Figure 11:
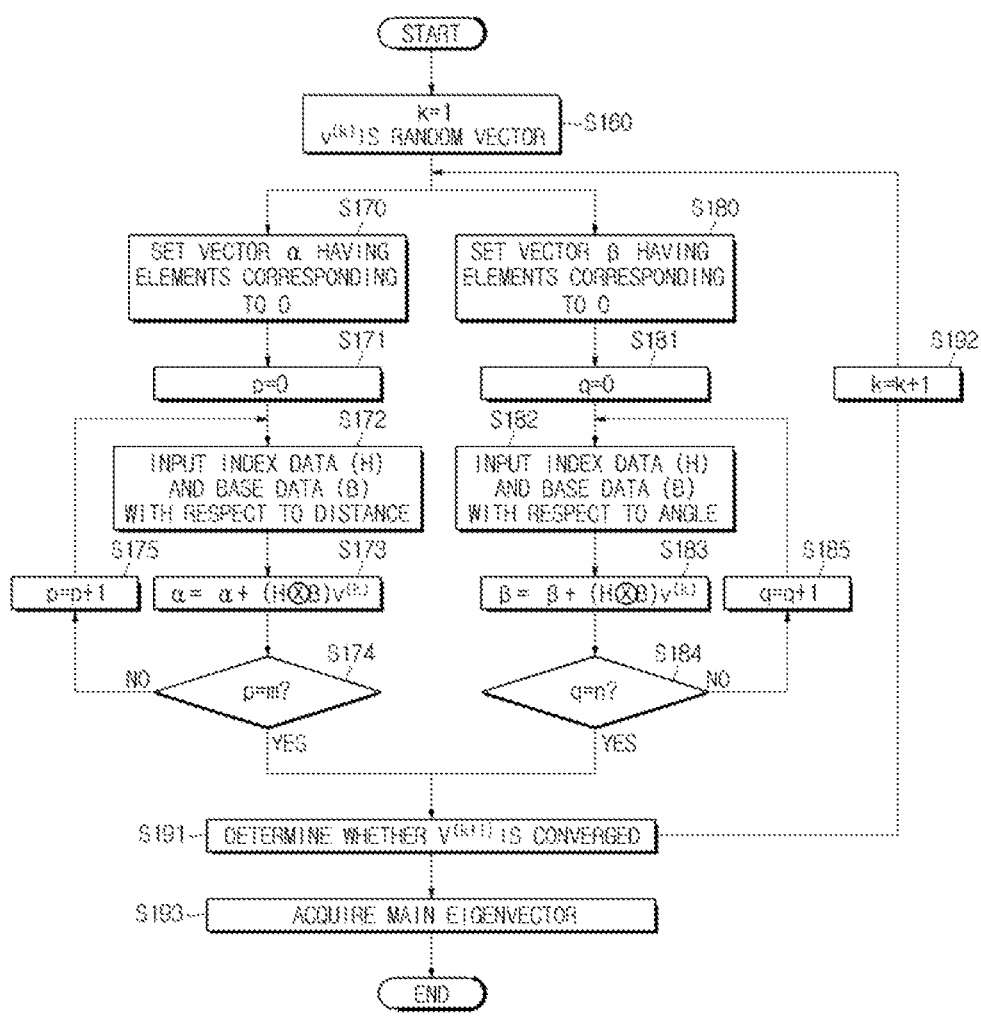
FIG. 11 is a flowchart illustrating a similarity calculation method according to an example embodiment.

FIG. 11 is a flowchart illustrating a similarity calculation method according to an example embodiment. The similarity calculation method may calculate similarity by computing a principal eigenvector using the index matrix and base matrix of each of the distance similarity matrix and the angle similarity matrix without using the similarity matrix, the distance similarity matrix and the angle similarity matrix.

As shown in operation S160, a random vector $v^{(1)}$ is given as an initial value. The vector $v^{(1)}$ given as the initial value may be a vector normalized to 1.

As shown in operation S170, a vector α having elements corresponding to 0 may be set in order to calculate predetermined vectors for the distance index data H and the distance base data B. As shown in operations S171 and 172, upon setting of the vector α, the distance index data H and the distance base data B, for example, the distance index matrix and the distance base matrix are input. According to various embodiments, step S172 in which the distance index data H and the distance base data B are input may be performed simultaneously with or prior to step S170 in which the vector α is set.

As shown in operation S173, a value obtained by multiplying the Kronecker product of the distance index data H and the distance base data B by the vector $v^{(1)}$ and adding the vector α to the multiplication result is input.

As shown in operation S174, the value obtained in operation S173 is determined to be equal to 0 or not. If not, the value obtained in operation S173 is incremented, as shown in operation S175. Thus, operations S174 and S175 represent the operation S173 being repeated m times. Here, m may be a value obtained by dividing a maximum value $d_{max}$ of a distance by an approximation coefficient $\omega_d$ for the distance. Consequently, the result of Expression 18 is obtained.

$$\sum_{p=0}^{m-1} (H_A^{(p)} \otimes B_A^{(p)}) v \qquad \text{[Expression 18]}$$

Expression 18 corresponds to the right side of Equation 16, as discussed above.

Referring to operation S180, a vector β having elements corresponding to 0 is set in order to calculate predetermined vectors for the angle index data H and the angle base data B. Then, as shown in operations S181 and S182, the angle index data H and the angle base data B may be input. According to various embodiments, operation S182, in which the angle index data H and the angle base data B are input, may be performed simultaneously with or prior to operation S180 in which the vector β is set.

As shown in operation S183, a value obtained by multiplying the Kronecker product of the angle index data H and the angle base data B by the vector $v^{(1)}$ and adding the vector β to the multiplication result is input. As shown in operation S184, the value obtained in operation S183 is determined to be equal to 0 or not. If not, the value obtained in operation S183 is incremented, as shown in operation S185. Thus, operations S184 and S185 represent the operation S183 being repeated n times. Here, n may be a value obtained by dividing a maximum value $\theta_{max}$ of an angle by an approximation coefficient $\omega_\theta$ for the angle. Consequently, the result of Expression 19 is obtained.

$$\sum_{q=0}^{n-1}(H_A^{(q)} \otimes B_A^{(q)})v \quad \text{[Expression 19]}$$

In various embodiments, operations S180 to S185 may be performed at the same time as operations S170 to S175. Alternatively, in some embodiments, operations S180 to S185 may be performed at different times than operations S170 to S175.

Referring back to operations S174 and S184, if the values obtained in operations S173 and S184 are determined to be equal to 0, respectively, then upon acquisition of the results of Expressions 18 and 19, the results are summed and normalized to acquire a vector $v^{(k+1)}$. As shown in operation S191, it is determined whether the vector $v^{(k+1)}$ is converged. When the vector $v^{(k+1)}$ is not converged, operations S170 to S185 are repeated using $v^{(k+1)}$ as an initial value, as shown in operation S192. In various embodiments, it is possible to determine whether the vector $v^{(k+1)}$ is converged by comparing $v^{(k)}$ with $v^{(k-1)}$. For example, it can be determined that the vector $v^{(k+1)}$ is converged when the difference between $v^{(k)}$ and $v^{(k-1)}$ is less than a predetermined and/or desired constant.

If it is determined that $v^{(k+1)}$ is converged, then as shown in operations S193, principal eigenvector is acquired. In various embodiments, the converged $v^{(k)}$ can be acquired as the principal eigenvector. The principal eigenvector may include similarity information about a similarity between each piece of the first data of the first data group X and each piece of the second data of the second data group Y. Accordingly, it is possible to acquire a similarity value between each piece of the first data of the first data group X and each piece of the second data of the second data group Y and to detect first data and second data corresponding to each other using the acquired similarity value.

Figure 12:
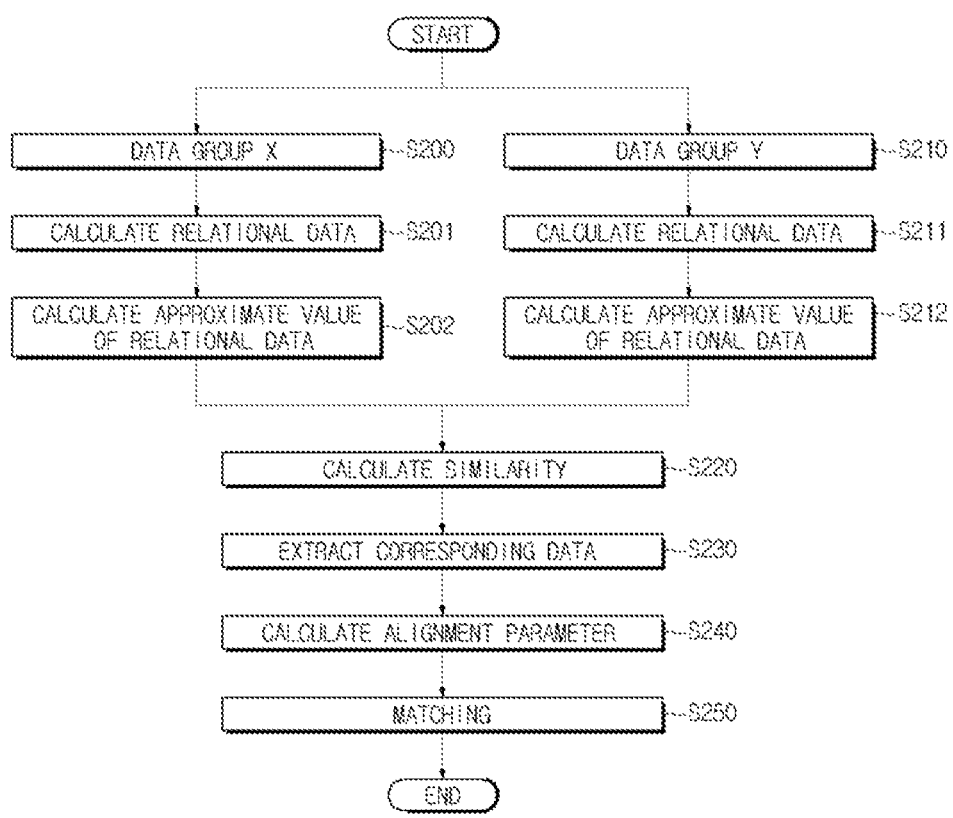
FIG. 12 is a flowchart illustrating a data matching method according to another example embodiment.

FIG. 12 is a flowchart illustrating a data matching method according to another example embodiment.

As shown in operation S200, the first data group X is acquired. As shown in operation S201, first relational data regarding at least one piece of first data of the acquired first data group X is calculated. As shown in operation S202, an approximate value of the first relational data can be calculated using the first relational data. In various embodiments, the above-mentioned Equation 1 and/or Equation 2 may be used in order to calculate the approximate value of the first relational data.

As shown in operation S210, the second data group Y is acquired. As shown in operations S211, upon acquisition of the second data group Y, second relational data regarding at least one piece of second data of the second data group Y is computed. As shown in operation S212, an approximate value of the second relational data is calculated. In various embodiments, Equation 2 may be used to calculate the approximate value of the second relational data. Here, the approximation coefficient of Equation 2 may be identical to or different than the approximation coefficient of Equation 1. According to various embodiments, operations S210, S211 and S212 may be performed at the same time as operations S200, S201 and S202. In other embodiments, operations S210, S211 and S212 may be performed at different times than operations S200, S201 and S202.

As shown in operation S220, similarity between at least one piece of the first data of the first data group X and at least one piece of the second data of the second data group Y is calculated. In various embodiments, the similarity may be calculated using the approximate value of the first relational data and the approximate value of the second relational data.

As shown in operation S230, first data and second data corresponding to each other, from among at least one piece of the first data of the first data group X and at least one piece of the second data of the second data group Y, are determined and extracted using the calculated similarity.

As shown in operation S240, alignment parameters are calculated based on the first data and second data corresponding to each other. According to various embodiments, the calculated alignment parameters may be predetermined and/or desired alignment parameters.

As shown in operation S250, the first data group X and the second data group Y are matched using the calculated alignment parameters.

It should be understood that the exemplary embodiments described above should be considered in a descriptive sense only and not for purposes of limitation. Descriptions of features or aspects within each example embodiment should be considered as available for other similar features or aspects in other embodiments.

What is claimed is:

1. A data matching method comprising:
   receiving, by an imaging device, at least one piece of first relational data and at least one piece of second relational data,
   the at least one piece of first relational data being associated with a plurality of pieces of first data, and
   the at least one piece of second relational data being associated with a plurality of pieces of second data
   calculating, by the imaging device, an approximate value of the at least one piece of second relational data;
   calculating, by the imaging device, a similarity based on the at least one piece of first relational data and the approximate value of the at least one piece of second relational data;
   determining, by the imaging device, a correspondence between at least one piece of the first data from among the plurality of pieces of the first data and at least one piece of the second data from among the plurality of pieces of the second data, the correspondence being based on the calculated similarity;
   calculating, by the imaging device, an alignment parameter based on the determined correspondence; and
   matching, by the imaging device, a first data group including the at least one piece of the first data with a second data group including the at least one piece of the second data, the matching being based on the alignment parameter.

2. The data matching method according to claim 1, wherein
   the first relational data is associated with a distance between each of the plurality of pieces of the first data or an angle between each of the plurality of pieces of the first data, and
   the second relational data is associated with a distance between each of the plurality of pieces of the second data or an angle between each of the plurality of pieces of second data.

3. The data matching method according to claim 1, wherein calculating the similarity comprises:
   calculating similarity measure data based on the at least one piece of first relational data and the approximate value of the at least one piece of second relational data;
   calculating the similarity based on the similarity measure data; and
   determining a correspondence between the plurality of pieces of the first data and the plurality of pieces of the second data based on the calculated similarity.

4. The data matching method according to claim 3, wherein calculating the similarity measure data comprises:
   calculating distance similarity measure data based on a distance between each of the plurality of pieces of the first data and an approximate value of a distance between each of the plurality of pieces of the second data;
   calculating angle similarity measure data based on an angle between each of the plurality of pieces of the first data and an approximate value of an angle between each of the plurality of pieces of the second data; and
   calculating the similarity using the distance similarity measure data and the angle similarity measure data.

5. The data matching method according to claim 3, wherein the similarity measure data corresponds to base data and index data, the index data including information about the base data.

6. The data matching method according to claim 5, wherein determining correspondence between the first data and the second data is based on the index data and the base data.

7. The data matching method according to claim 5, wherein the index data and the base data are associated with at least one of a distance between each of the plurality of pieces of the first data, a distance between each of the plurality of pieces of the second data, an angle between each of the plurality of pieces of the first data, and an angle between each of the plurality of pieces of the second data.

8. The data matching method according to claim 3, wherein the similarity is a principal eigenvector calculated from the similarity measure data.

9. The data matching method according to claim 1, wherein calculating the alignment parameter comprises:
   determining a relationship between the plurality of pieces of the first data and the plurality of pieces of the second data that correspond to each other.

10. The data matching method according to claim 9, wherein calculating the alignment parameter further comprises:
    performing a regression analysis on the plurality of pieces of the first data and the plurality of pieces of the second data that correspond to each other.

11. A data matching apparatus comprising:
    a relational data calculator configured to calculate at least one piece of first relational data associated with the plurality of pieces of a received first data and at least one piece of second relational data associated with the plurality of pieces of a received second data;
    an approximate calculator configured to calculate an approximate value of the at least one piece of second relational data;
    a data determination unit configured to,
       calculate a similarity based on the at least one piece of first relational data and the approximate value of the at least one piece of second relational data, and
       determine a correspondence between at least one of the plurality of pieces of the first data and at least one of the plurality of pieces of the second data, the correspondence being based on the calculated similarity;
    an alignment parameter calculator configured to calculate an alignment parameter based on the determined correspondence; and
    a matching unit configured to match a first data group including the at least one piece of the first data and a second data group including the at least one piece of the second data based on the alignment parameter.

12. The data matching apparatus according to claim 11, wherein
    the first relational data is associated with a distance between each of the plurality of pieces of the first data or an angle between each of the plurality of pieces of the first data, and
    the second relational data is associated with a distance between each of the plurality of pieces of the second data or an angle between each of the plurality of pieces of second data.

13. The data matching apparatus according to claim 11, wherein the data determination unit is further configured to:
    calculate similarity measure data based on the at least one piece of first relational data and the approximate value of the at least one piece of second relational data,
    calculate the similarity based on the similarity measure data, and
    determine a correspondence between the plurality of pieces of the first data and the plurality of pieces of the second data based on the calculated similarity.

14. The data matching apparatus according to claim 13, wherein the data determination unit is further configured to:
    calculate distance similarity measure data based on a distance between the plurality of pieces of the first data and an approximate value of a distance between the plurality of pieces of the second data,
    calculate angle similarity measure data based on an angle between the plurality of pieces of the first data and an approximate value of an angle between the plurality of pieces of the second data, and
    calculate the similarity using the distance similarity measure data and the angle similarity measure data.

15. The data matching apparatus according to claim 13, wherein the similarity measure data corresponds to base data and index data, the index data including information about the base data.

16. The data matching apparatus according to claim 15, wherein the data determination unit is further configured to determine the correspondence based on the index data and the base data.

17. The data matching apparatus according to claim 15, wherein the index data and the base data are associated with at least one of a distance between each of the plurality of pieces of the first data, a distance between each of the plurality of pieces of the second data, an angle between each of the plurality of pieces of the first data, and an angle between each of the plurality of pieces of the second data.

18. The data matching apparatus according to claim 13, wherein the similarity is a principal eigenvector calculated from the similarity measure data.

19. The data matching apparatus according to claim 18, wherein the alignment parameter calculator is further configured to:
   perform a regression analysis on the plurality of pieces of the first data and the plurality of pieces of the second data that correspond to each other.

20. The data matching apparatus according to claim 11, wherein the alignment parameter calculator is further configured to:
   determine a relationship between the plurality of pieces of the first data and the plurality of pieces of the second data that correspond to each other.

* * * * *